Oct. 16, 1934.    J. BARELS    1,976,761
ENGINE
Filed Oct. 19, 1929    3 Sheets-Sheet 1
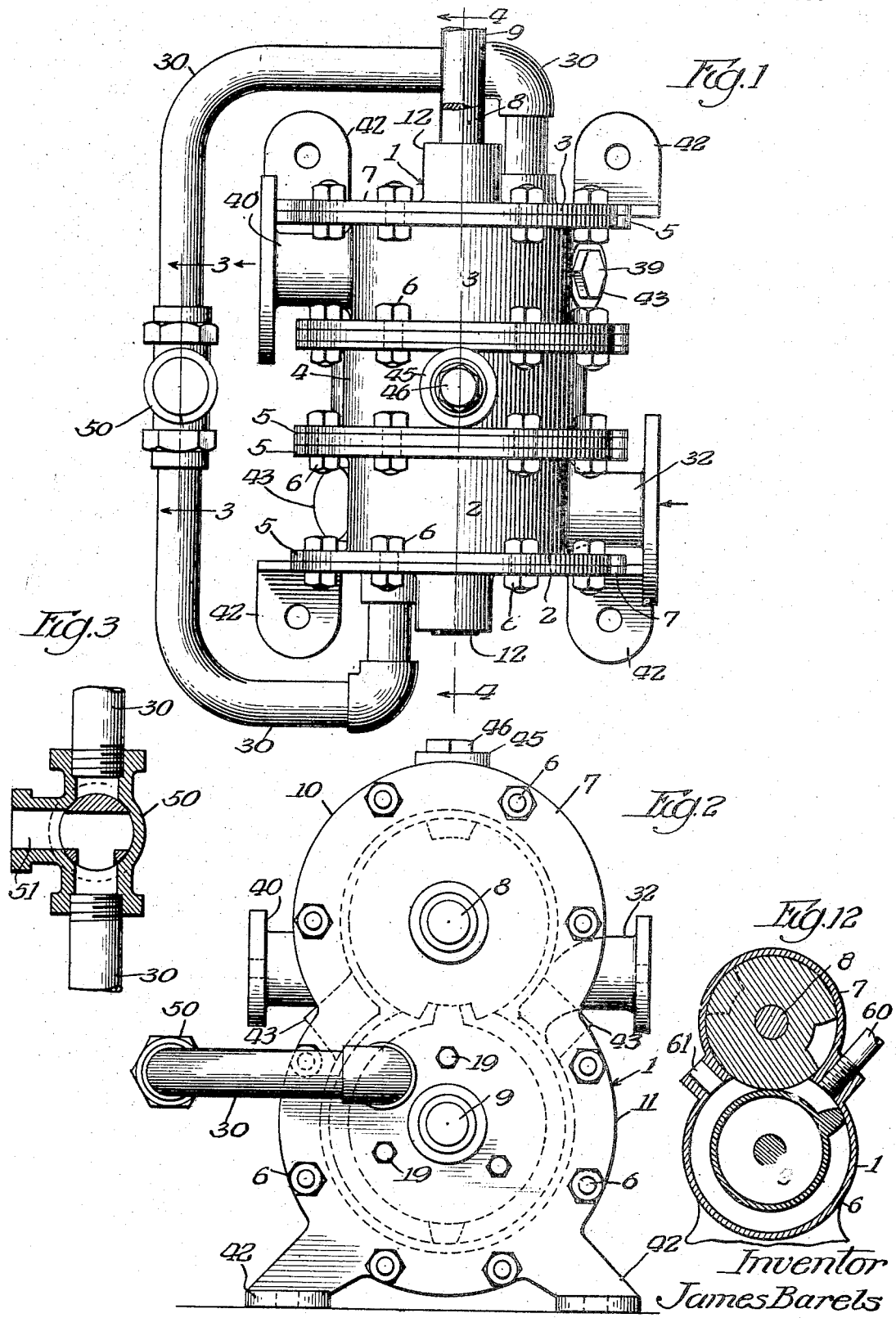

Oct. 16, 1934.  J. BARELS  1,976,761
ENGINE
Filed Oct. 19, 1929  3 Sheets-Sheet 2
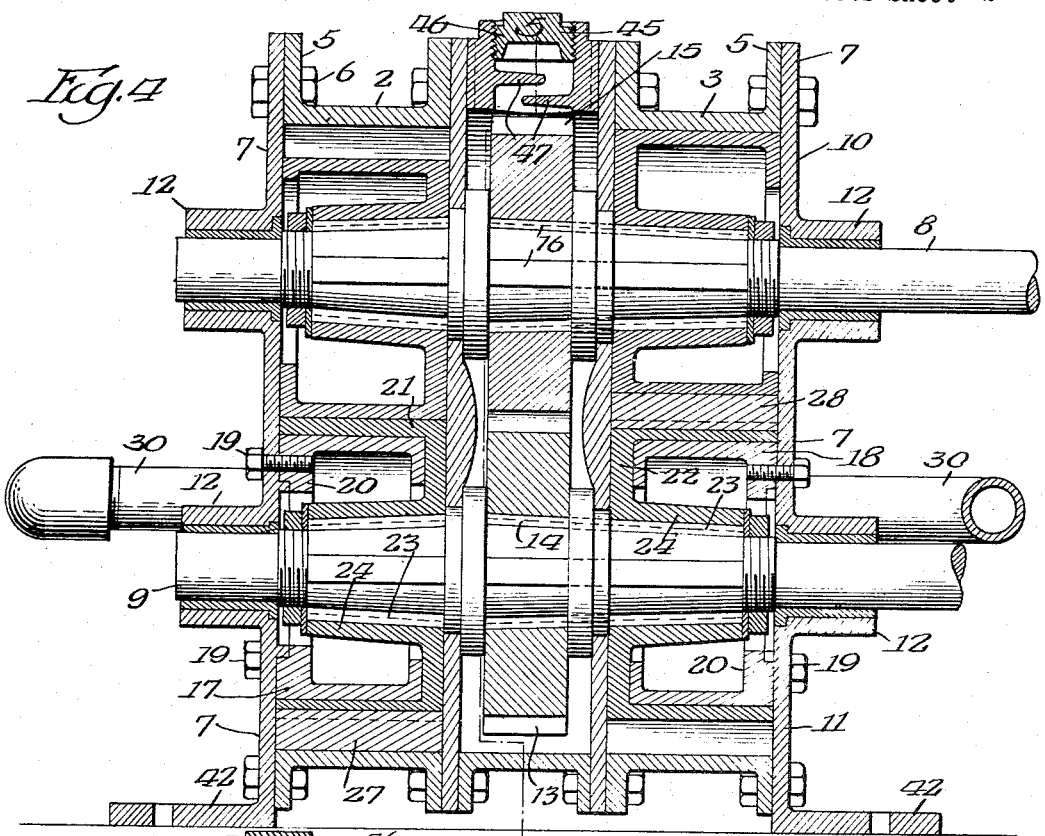
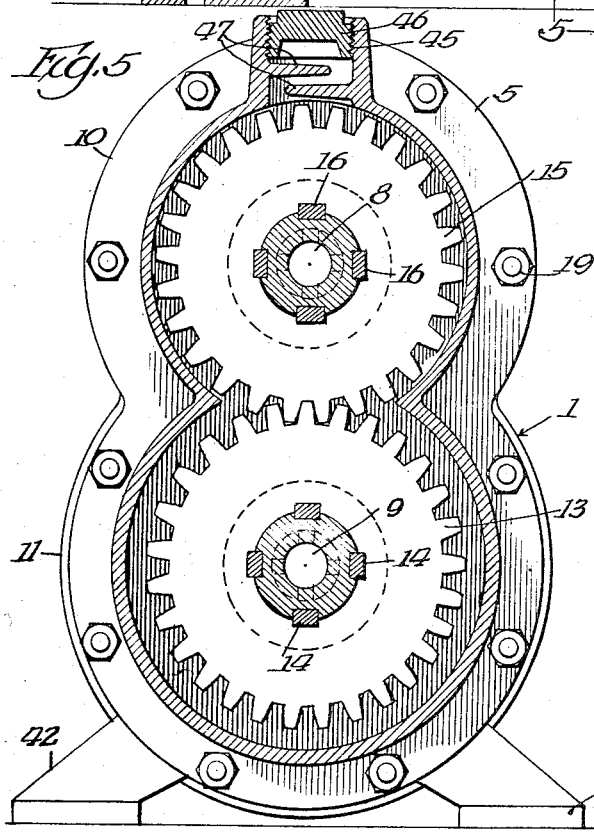
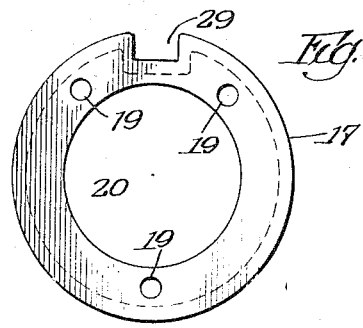
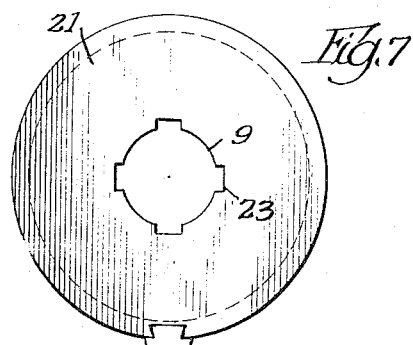

Oct. 16, 1934.  J. BARELS  1,976,761

ENGINE

Filed Oct. 19, 1929  3 Sheets-Sheet 3

Inventor
James Barels
By Cheever, Cox & Moore Attys

Patented Oct. 16, 1934

1,976,761

UNITED STATES PATENT OFFICE 1,976,761

ENGINE

James Barels, Chicago, Ill.

Application October 19, 1929, Serial No. 400,769

4 Claims. (Cl. 123—13)

This invention relates to engines.

The primary object of the invention is to provide an engine which is compact in construction, which is efficient in operation, and which can be readily and economically manufactured.

Another object is to provide an engine of the four cycle type, whereby the engine has rotary motion instead of having reciprocatory motion, as is the case of conventional internal combustion engines.

A further object is to provide an improved rotary engine which can be driven by an explosion like ordinary internal combustion engines.

Still another object is to provide an engine having rotors which may be driven by combustion or steam pressure, or which may be operated by a motor to convert the engine into a pump.

Numerous other objects and advantages will appear throughout the progress of the specification.

The invention comprises in general an engine casing having a pair of rotors fixed to a common shaft and rotatably mounted in the engine casing. A similar pair of rotors are mounted on another shaft and arranged above the first pair of rotors. A gear is mounted on each of the shafts and has intermeshing relation to cause synchronization of both of the shafts. The upper pair of rotors have contacting relation with the lower pair of rotors and form a seal therebetween. The lower rotors rotate about a fixed cylinder and have a piston extending entirely across their faces, and an elongated slot adjacent each piston. The slots register with a transfer channel in cylinders or drums to take care of the gases when compressed.

The accompanying drawings illustrate a selected embodiment of the invention and the views therein are as follows:
Fig. 1 is a top plan view of the improved engine.

Fig. 2 is an end view thereof.

Fig. 3 is a detail sectional view on the line 3—3 of Fig. 1.

Fig. 4 is a longitudinal sectional view on the line 4—4 of Fig. 1.

Fig. 5 is a transverse sectional view on the line 5—5 of Fig. 4.

Fig. 6 is a detail elevation of one of the cylinders.
Fig. 7 is a detail end elevation of one of the rotors.

Fig. 12 is a diagrammatic view showing the engine used as a pump or compressor.

Figure 8:
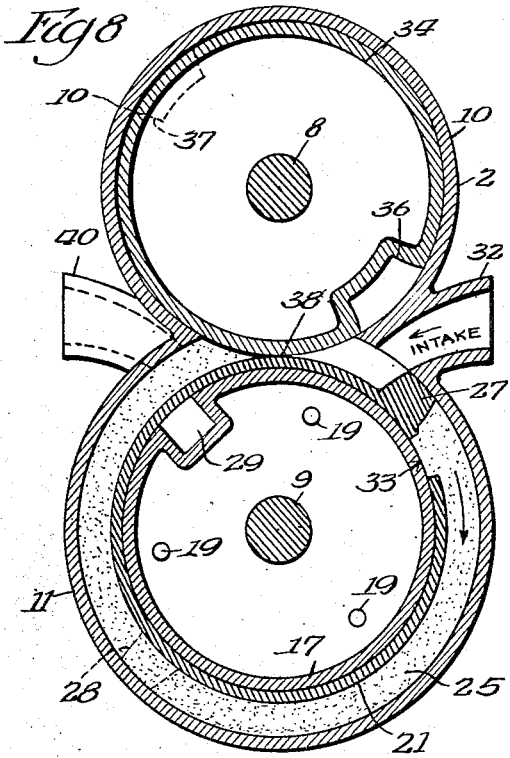
Figs. 8 to 11 are diagrammatic views showing progressive operations of the engine.
Figure 10:
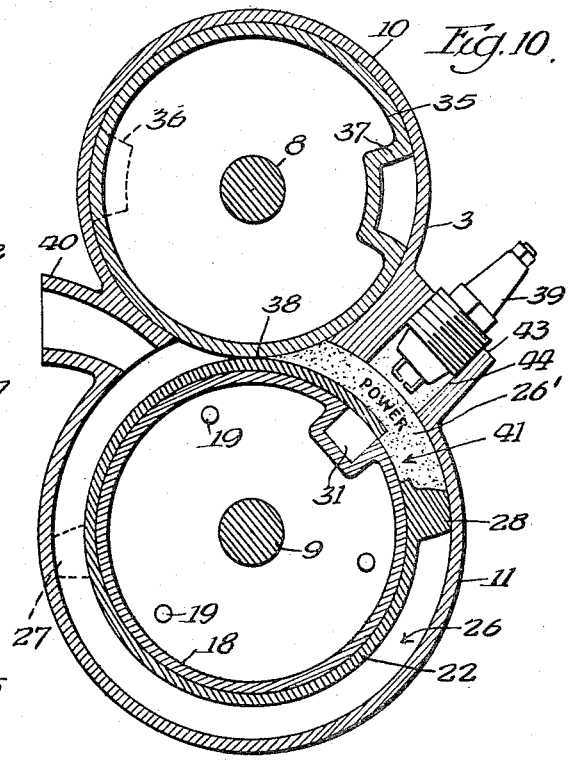
Figure 9:
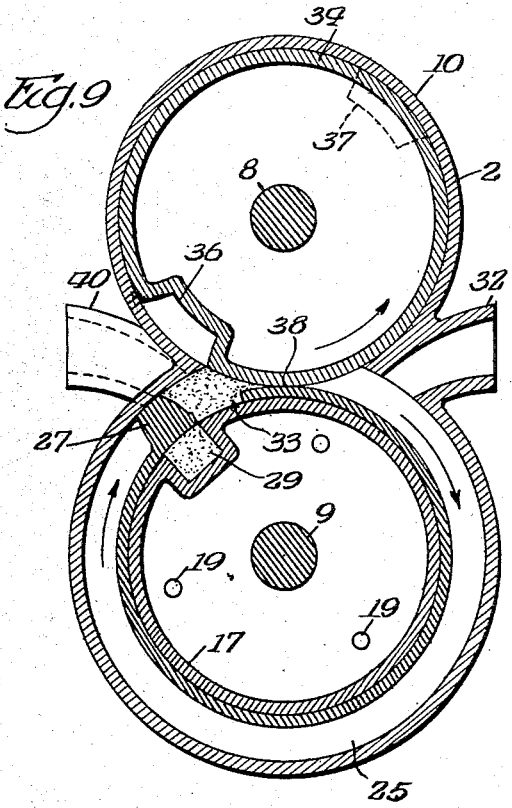

Referring to the drawings, 1 designates generally an engine casing comprising the end members 2 and 3 and the central member 4. Each of these three members is provided with peripheral flanges 5, through which bolts 6 pass for securing the three members together and for fastening the end members 2 and 3 to end heads or plates 7. The end members are made substantially in the shape of a figure 8, as clearly shown in the various figures. Upper and lower shafts 8 and 9 extend through the upper and lower parts 10 and 11 respectively of the casing and are supported in suitable journals or bearings 12. A gear 13, Fig. 4, is held to the lower shaft 9 by keys 14, and this gear meshes with a companion gear 15, which is mounted on the upper shaft 8. The gear 15 is held by keys 16 and rotates this latter shaft at the same speed as shaft 9.

Figure 11:
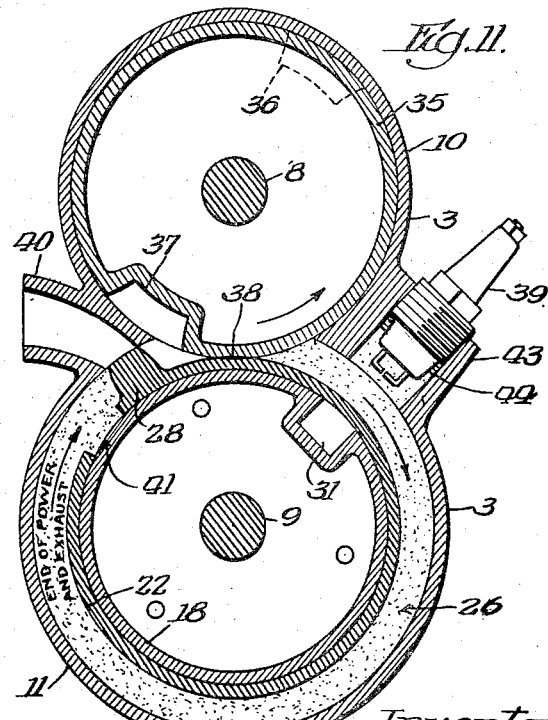

Lower drums or cylinders 17 and 18 are fastened to the end plates or heads 7 at the lower part 10, by means of bolts 19 passing through the returned flanged end 20 of the drums. Rotors 21 and 22 are fastened to the shaft 9 by means of keys 23 engaging slots in the shaft and in the rotor flanges 24. The rotors 21 and 22 fit over the drums or cylinders 17 and 18 respectively and are rotated while the drums 17 and 18 remain stationary. The outside diameter of the rotors is considerably smaller than the inside diameter of the lower part 10 of the parts 2 and 3 of the casing 1, and provides the annular spaces or chambers 25 and 26. Pistons or lugs 27 and 28 extend completely across the rotors 21 and 22 respectively and extend outwardly from the rotors to substantially the inside of the casing, Figs. 8 to 11.

The drum 17 has a channel shaped slot 29 forming a chamber which has communication with a pipe line 30 connected to the plate 7 on the member 2 of the casing. This pipe line extends around the casing and is mounted on the end plate of member 3 of the casing and communicates with the chamber formed by the channel 31 in the drum 18.

An intake line 32 operatively connected to a carburetor (not shown) has communication with the annular chamber 25, and it is through this intake that gas is fed into the space or chamber 25. The rotor 21 has a slot 33 just forward of the piston 27 and permits communication of the space 25 with the pipe line 30 when the slot 33 registers with the channel 29 in the drum 17.

Upper rotors 34 and 35 are provided with slots 36 and 37 respectively, into which the pistons 27 and 28 extend during rotation of the rotors, the lower rotors 21 and 22 rotating simultaneously and at the same speed as the rotors 34 and 35 due to the gearing arrangement. The upper rollers contact with the lower rollers at 38 and prevent gases from escaping in a direction reverse to the directional arrows shown in the diagrammatic Figs. 8 to 11.

All gases in front of the piston 27, Fig. 8, are compressed due to the movement of the piston in the chamber 25 during rotation of the rotor 21. This rotation creates a suction rearwardly of the piston and draws in gases through the intake 32. As the rotor turns, the slot 33 therein will coincide with the channel 29 in the drum 17 and cause the compressed gas to escape through the pipe line 30 and enter into the combustion chamber 26' of the chamber 26, under compression. A spark plug 39 ignites the compressed gas at the proper time and causes an explosion of the compressed gas in the combustion chamber 26' rearwardly of the piston 28 and drives the rotor 22 in the direction of the arrow shown in Fig. 10. When the piston 28 passes the exhaust 40 the exploded gases pass out through this exhaust. The power thus created carries the abutment 28 past the channel 31 in the rotor 22, bringing the slot 41 into registration with the channel 31 to permit a new charge of gas to enter the combustion chamber 26'. The slot 41 acts with the channel 31 in the same manner as the channel 29 acts with the slot 33. The principle of operation is similar to the conventional type of reciprocatory internal combustion engine, except rotors are revolved instead of pistons reciprocated. The upper rotors 34 and 35 merely act as a seal against the lower rotors 21 and 22, and the slots 36 and 37 are provided merely for permitting the pistons 27 and 28 to pass. The present engine is of the four cycle type, first taking gas through the intake, compressing this gas in the portion 2 of the engine, Figs. 8 and 9, delivering this compressed gas through the line 30, feeding it through the channel 31 in the drum 18 into the combustion chamber 26' of the chamber 26, where the explosion takes place, Fig. 10, and then exhausting the exploded gases out through the exhaust opening 40.

Feet or supports 42 may be cast integral with the end members 7 to form a support for attaching the motor to the device which it is to propel, or to any suitable support.

The parts 2 and 3 of the motor are exactly the same, may be cast from the same mould, and have a lug 43 cast integral therewith. When used for the member 2 of the casing, this lug is left blank, and when used as the member 3 it is bored at 44 for the reception of the spark plug. By making the parts in this manner I am able to use one member acting as two separate units of the casing.

It is preferable that the gears 13 and 15 run in grease, which is put in an opening 45 in the top of the central member 4, and this opening may be covered with a cap 46, Fig. 4. Baffles 47 may extend across the opening, as clearly shown in Fig. 4, to prevent any of the grease from flying out through the opening 45, should the cap 46 be removed during operation of the engine.

It is preferable that the shaft 9 be used as the driving shaft, as clearly shown in Fig. 2. The shaft 8 may also be extended and connected with suitable starting means for initially turning over the motor in a manner well known in the art.

Instead of having the motor operated as an internal combustion motor, as previously described, it may be operated by steam. A three-way valve 50, Fig. 3, may be arranged in the pipe line 30, and be provided with a line 51, which leads to a suitable source of steam supply. When the engine is used as an internal combustion engine, the valve is turned to close off the line 51, permitting free communication through the pipe line 30. When steam is used the valve is turned to block off the pipe line 30, and in one embodiment pass through the part of the pipe line 30 into the channel 31. This steam pressure will then pass through the slot 41 in the rotor 22, and force the piston 28 in the direction of the arrows shown in Figs. 10 and 11, and cause the rotor 22 to revolve. After the abutment 28 passes the exhaust 40 the expanded steam rearwardly of the piston is free to pass out through this exhaust line. The momentum or inertia caused by the rotating rotor brings the piston around past the center, again causing the slot 41 to register with the channel 31 and provide a new charge of steam into the chamber to complete another cycle of operation.

To rotate the engine in a reverse direction the valve 50 is turned to permit free communication from the line 51 to the part 2 of the engine. The steam then enters through the channel 29, and as the slot 33 registers with the channel 29, the steam will enter the chamber 25 and operate against the piston 27 to rotate the rotor 21, it being understood, of course, that the carburetor is removed from the intake 32, which will then act as an exhaust to permit the expanded steam to escape.

The device can be used advantageously as a pump for pumping gases or fluids. In this latter embodiment the slot 33 or 41 is dispensed with, leaving the rotor body continuous. A prime mover, not shown, may be connected to the shaft 9 to cause rotation of the rotor. This rotary movement of the rotor creates a vacuum in the chamber surrounding the rotor, and draws in the material to be pumped through an inlet line 60. Continued rotation of the rotor causes the abutment to carry the material to be pumped partially around the rotor and discharge it through the discharge line 61.

The invention provides a compact and highly efficient motor, which can be used advantageously as an internal combustion motor, a steam driven motor or a pump or compressor. By having rotors instead of the usual reciprocating pistons, greater efficiency is provided, the parts will wear longer, and practically all vibration inherent in the reciprocatory type of engine is eliminated. The engine is simple, can be readily and quickly assembled and can be economically manufactured.

It is to be noted that the explosion takes place against a member which is always at right angles to the shaft instead of directly toward a shaft as is the case of a reciprocating engine, where the connecting rod is directly bearing against the crank shaft. It is to be understood, of course, that suitable means for oiling the engine are provided, and that suitable cooling means are also provided. The oiling and cooling means are not shown in the present illustration, as this invention merely covers the mechanical features and operation of the engine.

Changes may be made in the form, construction and arrangement of the various parts without departing from the spirit of the invention or sacrificing any of the advantages thereof, and the right is hereby reserved to make all such changes as fairly fall within the scope of the following claims.

I claim:

1. In an engine device, a casing comprising a plurality of compartments, a shaft supported by said casing, a drum fixed to a wall of said casing and extended into one of said compartments, a rotor fixed to the shaft and extending about said drum but spaced from a wall of the casing to present a chamber, said drum having a longitudinal slot therein, said rotor having an abutment thereon forming a piston, said rotor also having a slot therein adjacent the piston, a conducting passage adapted to communicate with said chamber, a second conducting passage adapted to communicate with the longitudinal slot in the drum, a second shaft spaced from the first shaft, and a second rotor surrounding said second shaft and having its periphery constantly engaging the periphery of the first rotor, said second rotor having a longitudinal slot therein which is adapted to receive the piston of the first rotor.

2. In an engine device, a casing comprising a plurality of compartments, a shaft supported by said casing, a drum fixed to a wall of said casing and extended into one of said compartments, a rotor fixed to the shaft and extending about said drum but spaced from a wall of the casing to present a chamber, said drum having a longitudinal channel shaped slot therein, said rotor having a longitudinal abutment thereon forming a piston, said rotor also having a longitudinal slot therein adjacent the piston, a conducting passage adapted to communicate with said chamber, a second conducting passage adapted to communicate with the longitudinal slot in the drum, a second shaft spaced from the first shaft, and a second rotor surrounding said second shaft and having its periphery constantly engaging the periphery of the first rotor, said second rotor having a longitudinal slot therein which is adapted to receive the piston of the first rotor.

3. In an engine device, a casing comprising a plurality of compartments, a shaft supported by said casing, a drum fixed to a wall of said casing and extended into one of said compartments, a rotor fixed to the shaft and extending about said drum but spaced from a wall of the casing to present a chamber, said drum having a longitudinal slot therein, said rotor having an abutment thereon forming a piston, said rotor also having a slot therein adjacent the piston, a conducting passage adapted to communicate with said chamber, a second conducting passage adapted to communicate with the longitudinal slot in the drum, a second shaft spaced from the first shaft, and a second rotor surrounding said second shaft and having its periphery constantly engaging the periphery of the first rotor, said second rotor having a longitudinal slot therein which is adapted to receive the piston of the first rotor, the circumferential contacting surfaces of said rotors being equal.

4. In an internal combustion engine, a casing comprising a plurality of compartments, a shaft supported by said casing, a drum fixed to a wall of said casing and extended into one of said compartments, a rotor fixed to the shaft and extending about said drum but spaced from a wall of the casing to present a chamber, said drum having a longitudinal slot therein, said rotor having an abutment thereon forming a piston, said rotor also having a slot therein adjacent the piston, a conducting passage adapted to communicate with said chamber, a second conducting passage adapted to communicate with the longitudinal slot in the drum, a second shaft spaced from the first shaft, a second rotor surrounding said second shaft and having its periphery constantly engaging the periphery of the first rotor, said second rotor having a longitudinal slot therein which is adapted to receive the piston of the first rotor, and fuel igniting means associated with said chamber adapted to cause an explosion when said piston occupies a given position within said chamber.

JAMES BARELS.